(No Model.) 3 Sheets—Sheet 1.

J. BACHMAN.
REEL FOR HARVESTERS.

No. 347,551. Patented Aug. 17, 1886.

WITNESSES:
Ellen P. Kinsey
Ida T. Kinsey

INVENTOR
Jacob Bachman

Thomas P. Kinsey
ATTORNEY

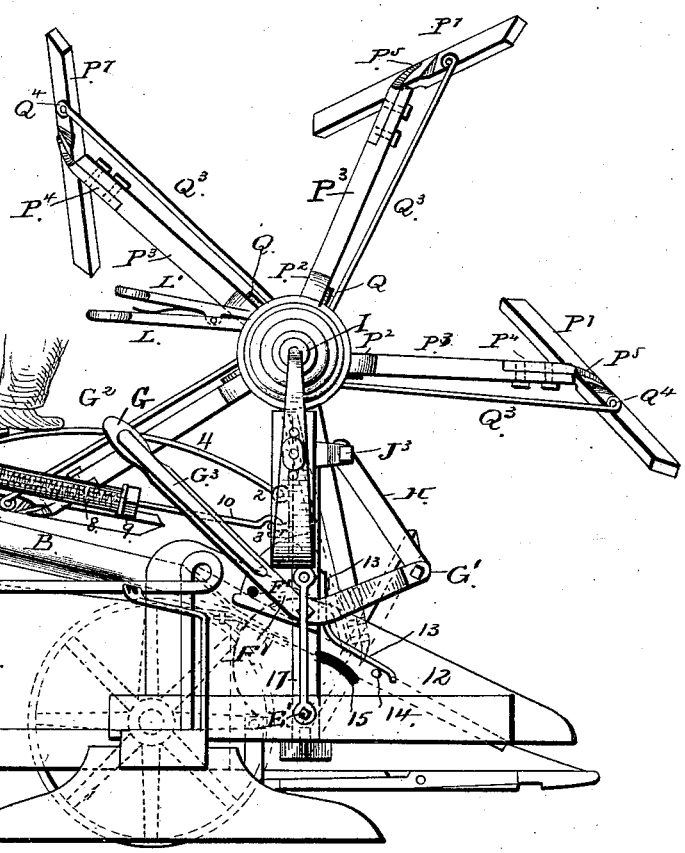

(No Model.) 3 Sheets—Sheet 3.
J. BACHMAN.
REEL FOR HARVESTERS.
No. 347,551. Patented Aug. 17, 1886.
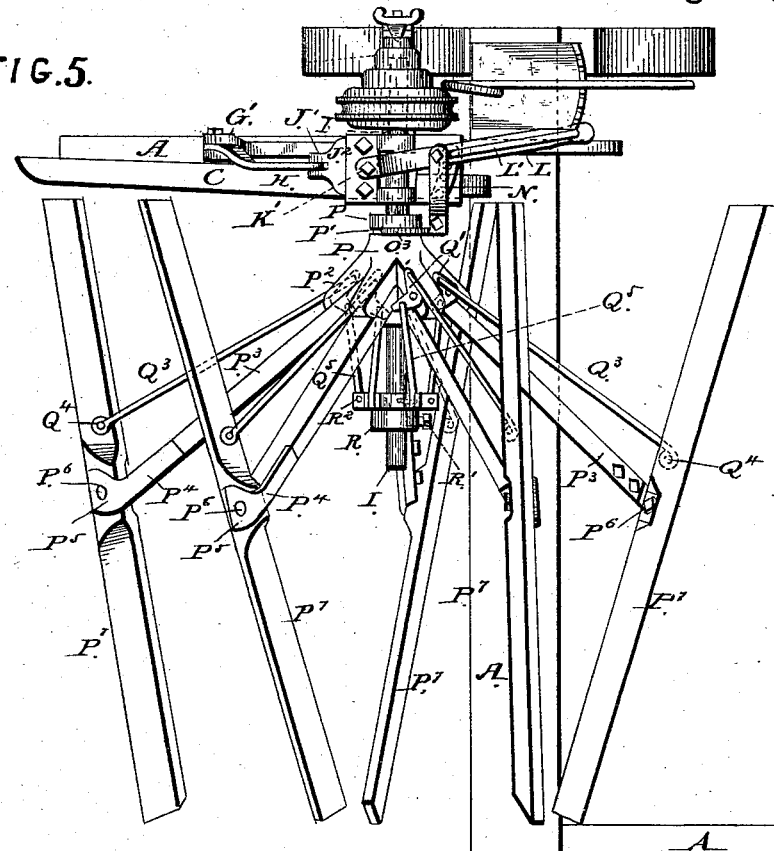
FIG.5.
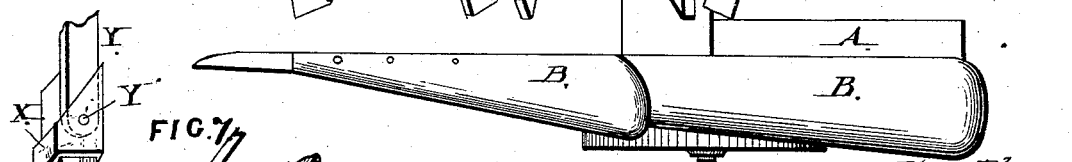
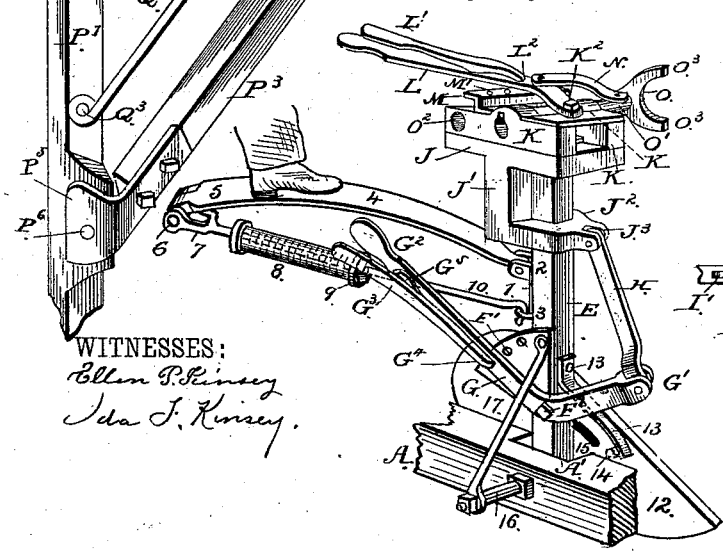
FIG.7.
FIG.6.
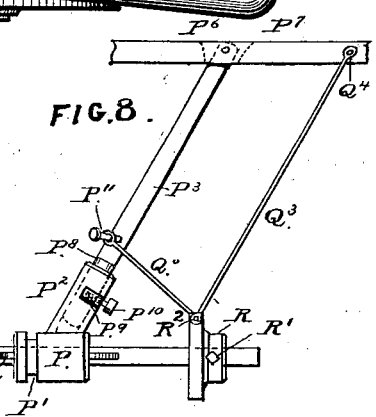
FIG.8.
WITNESSES:
Ellen P. Kinsey
Ida J. Kinsey
INVENTOR
Jacob Bachman
BY
Thomas P. Kinsey
ATTORNEY

UNITED STATES PATENT OFFICE.

JACOB BACHMAN, OF STONY RUN, PENNSYLVANIA.

REEL FOR HARVESTERS.

SPECIFICATION forming part of Letters Patent No. 347,551, dated August 17, 1886.

Application filed May 5, 1885. Serial No. 164,436. (No model.)

*To all whom it may concern:*

Be it known that I, JACOB BACHMAN, a citizen of the United States, residing at Stony Run, county of Berks, State of Pennsylvania, have invented a new and useful Improvement in Reels for Harvesters, of which the following is a specification.

This invention relates to reels for binders; and it consists in the novel construction of the same, as hereinafter fully described and claimed.

The object of the improvement is to give the operator of a binder, reaper, &c., a quick and ready control of the reel, by which he is enabled to pick up and draw within reach of the cutter-bar all grain passed within reach of the machine. These objects are attained in the use of a reel constructed, mounted, and operated as shown in the accompanying drawings, upon which similar letters indicate similar parts.

Figure 1:
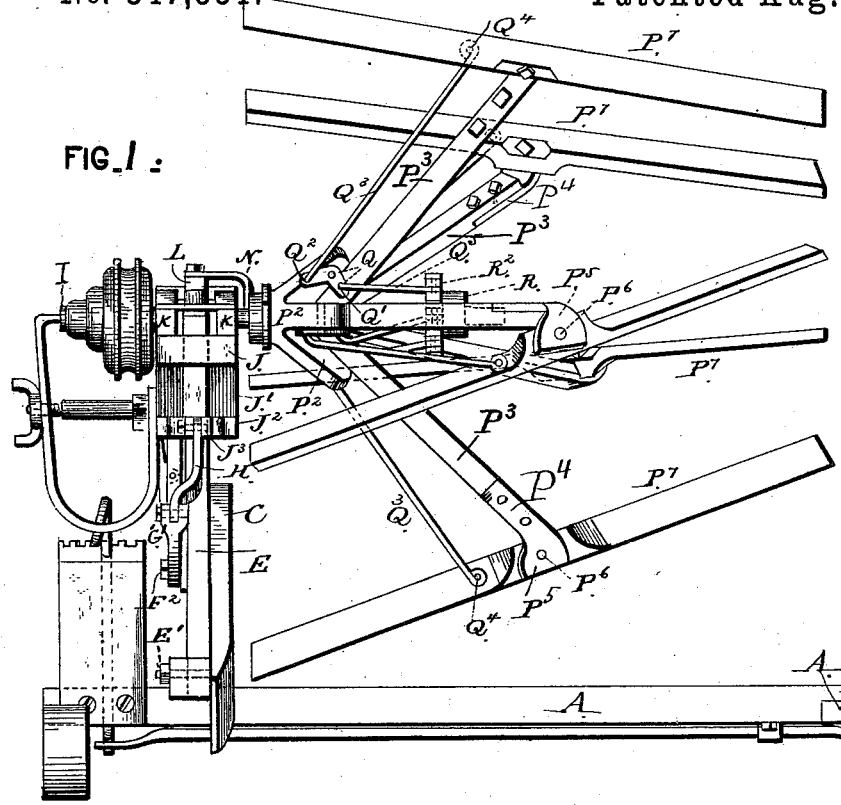
Figure 2:
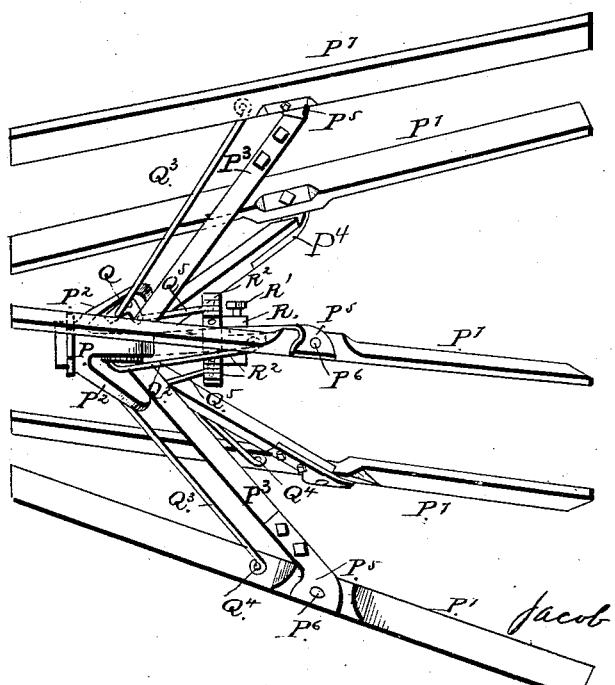

Figure 1, Sheet 1, is a front elevation looking toward the cutter-bar and apron, showing the reel, reel-shaft, carriage or reel-post, and driving device. Fig. 2, Sheet 1, is a top view of the reel detached from the shaft. Fig. 3, Sheet 2, represents an end elevation of the reel, the provision for raising and lowering the same, also the arrangement for giving a rocking movement to the reel-post; Fig. 4, Sheet 2, a detached view of a bar, arm, and link of the reel; Fig. 5, Sheet 3, a top plan of the reel, showing the device for shifting the sliding hub longitudinally upon the shaft, and thereby changing the angle of the reel-bats with reference to both the shaft and cutter-bar. Fig. 6, Sheet 3, represents in perspective an elevation of the reel-supporting post, showing the movable support for the reel-shaft, the shifting levers for the reel-sliding hub, the raising and lowering levers for the reel-support, together with the arrangement for giving a rocking movement to the reel-post. Fig. 7, Sheet 3, represents a means for lengthening the reel-bats. Fig. 8, Sheet 3, represents a modification for adjusting the reel-bats.

A represents a part of the ordinary framework of a binder, reaper, &c.; A', a V-shaped mortise or aperture cut in the sill for the reception of the reel-post; B, the divider; C, the inner divider. These portions differ in no respect from those in ordinary use.

E is a post, of a square or rectangular form in cross-section, mounted on a pivot-pin, E', in a mortise, A', in the frame A and secured therein by the said pin.

F is a quadrant attached to the post and perforated near its outer edge with holes F', the arc of the same being struck from the fulcrum F². Fulcrumed upon the pin F² is a main lever, G, provided with a bifurcated end, G', a spring-detent interlocking with the holes F' of the quadrant F. A spring, G⁵, retains it in place. A link, H, connects with the bifurcated end G', and at its opposite end with the sliding carriage or support for the reel-shaft I. The support or carriage is provided with a top plate, J, a vertical arm, J', and projected guide J², having a bifurcated ear, J³, for the reception of the link H. The top plate and the projected guide are perforated to slide freely upon the post E, and upon the top plate at its two opposite sides in line with the axis of the reel-shaft are secured bearing-boxes K K, adapted to receive the shaft I and the shifting-shaft O'. A cover-plate, K', bears a fulcrum, K², for the shifting-lever L at its front. A bar, M, bent to a curve struck from the fulcrum K², provided with a series of holes, M', serves to retain the lever L in place by its detent L' interlocking with the holes M' by the pin L² upon its shorter end. A short link, N, connects the lever L with a shifting head, O, forming an integral portion of the shifting shaft O', which slides in bearings O², provided in the boxes K K. The head has fingers O³, which fit freely within an annular groove, P', upon the reel-hub P. Wings P² project from the hub P and have arms P³ secured to them for carrying the reel-bats, so that the arms always stand at one fixed angle with relation to the reel-shaft.

P⁴ P⁵ are plates secured to the ends of the arms P³ and provided with twisted faces P⁵, to which the bats P⁷ are pivoted by means of the pins P⁶.

Q are bell-cranks pivoted to the wings P².

Q³ are rods which connect the arms Q² of the bell-cranks with pins Q⁴, projecting from the bats P⁷.

The arms Q' of the bell-cranks are connected by the rods Q⁵ to the ears R² of a spider, the central hub, R, of which may be adjusted lengthwise upon the shaft I.

R' is a set-screw for holding the spider at any desired position.

The position of the spider relative to the hub P will determine the amount of inclination which may be given to the reel-bats by sliding the hub P back and forth on the shaft I. When the hub P is moved longitudinally on the shaft I, it increases the diameter of the reel at one end and reduces it at the other, while the central part of the reel where pivoted to the arms P³ always remains of the same size. This movement of the reel-bats is accomplished by the jointed rod-work mechanism previously described, and the bats receive simultaneously an angular adjustment with respect to the reel-shaft from the twisted plates to which they are pivoted. Rotary motion may be given to the shaft I in any convenient manner. I prefer to use the spring and clutch arrangement shown, which forms the subject-matter of a separate application for Letters Patent filed February 19, 1886, Serial No. 192,600.

Sleeves X may be secured to the ends of the bats P⁷ when it is desired to have their length increased. Within the said sleeves the bats Y are pivoted at Y' against the working-faces of the bats. In case of obstructions being met they will rise and clear the same. In the same manner they will float over the guard or divider, gathering upon the apron any grain which may have lodged upon the same.

A modification is shown in Fig. 8, Sheet 3, in which the wings P² of the central hub are cast hollow of a cylindrical form, and the arms P³ are rounded at P⁸ to fit therein. The arms are secured therein by a screw, P¹⁰. A slot, P⁹, extends about one-fourth the circumference of the cylindrical wing, in which the pin P¹⁰ is easily moved. The link Q⁵ is connected with the spider at R² and with the arm P³ by a pin, P¹¹. The bat P⁷ is pivoted upon the arm at P⁶, and the link Q³ is pivoted to the bat at Q⁴, its opposite end being also connected with the spider at R². An analysis of the movement will show that upon sliding the hub P toward or from the fixed spider R that the link Q⁵ will rock the arm P³ correspondingly, and with it the bat P⁷. At the same time the link Q³ will raise or lower the end of the bat to which it is attached, and thus produce the same result as the bell-cranks and fixed arms upon the bats P⁷.

I give preference to the mode of operating first described. The shaft I and hub P are provided with a feather, I', permitting the hub to slide upon the shaft a sufficient distance to cover the changes to be made in the position of the bats.

It is desirable to be able to impart a rocking movement to the reel-post, and at the same time to accomplish it without entailing much physical exertion on the operator. To secure these objects I pivot the post at its lower end upon a pin, E'. This pin extends some distance beyond its support to support a brace to the post. A sleeve, 16, is slipped over the bolt between the pivot-nut and the brace 17, which is secured against the sleeve by a nut. The upper end of the brace is secured to the post above the lever G, so that the same may freely move beneath it. A plate, 1, having lugs 2 and 3, is secured to the post. To the lug 2 is attached a curved spring, 4, of a single leaf. A spiral-spring device consisting of an eye, 7, barrel 8, cap 9, and hooked rod 10 is attached to lug 3. The rear end of the spring 4 has an ear, 5, which mates with the bifurcated ears of the connection 7. A pin, 6, common to both, connects the device to the upright bracket 11, or to any convenient fixed point upon the machine. A spiral spring within the case 8 is held between a disk on the end of rod 10 and the cap 9 of the barrel 8 and tends to draw the post into a vertical position. A stop suitably placed limits the rearward movement of the same. Placing the foot upon the curved spring 4 and depressing the same, the length of the chord is increased and a forward movement given to the post and reel. On releasing the pressure the resilience of the spring in the barrel 8 returns the post to its normal position. In connection with this movement of the post I introduce a movement of the guard 12 or divider, which, for this purpose, I shorten at the rear and join to the remaining portion of the guard or divider by a joint limiting the upward movement of the movable portion, but leaving it free to drop at its forward end to accommodate itself to the inequalities of the ground over which the machine is passed. Meeting any unusual obstruction, it rises and clears the same. It is held normally to the ground by a spring, 13, bolted to the post, and which rests upon a projected pin, 14, properly secured in the guard 12. A segmental slot, 15, struck from the pivot-pin E', limits the drop of the guard. The combination of the automatically-moving guard with the rocking movement of the post and reel is of value in gathering up the grain toward the cutter-bar, leaving a clean space as it passes over the field.

In operating the several devices in combination the driver usually handles the reel and binding-levers with either the hands or knees, while the post movement is controlled by the foot as the machine is moving over the field. The several levers being placed within easy reach they are separated as the level of the ground and the lay of the grain toward or from the cutter-bar varies.

I claim—

1. In a harvester-reel, the combination of a reel-shaft, a sliding hub turning with the said reel-shaft, a series of arms secured to the said hub and having twisted plates on their outer ends, a series of bats pivoted to the said plates, an adjustable spider mounted on the said shaft, the bell-cranks pivoted to the sliding hub, and the jointed rod-work mechanism connecting the said bell-cranks with the spider and with the bats, so that the said bats are simultaneously spread outward and receive angular adjustment with respect to the reel-shaft when the hub is slid upon it longitudinally, substantially as set forth.

2. In a harvester-reel, the combination of the reel-shaft, the sliding hub turning with the said reel-shaft and having the annular groove P', the arms $P^3$, secured to the said hub and having the twisted plates $P^4$ $P^5$ at their outer ends, the bats $P^7$, pivoted to the said plates, the spider R, mounted on the reel-shaft, the bell-cranks pivoted to the sliding hub, the rods $Q^3$, connecting the bell-cranks with the bats, the rods $Q^5$, connecting the spider with the bell-cranks, the shifting yoke O, having fingers engaging with the said groove in the hub, a lever pivoted to the framing of the machine for operating the shifting yoke, and a spring-catch and quadrant for holding the said lever in any desired position, substantially as and for the purpose set forth.

3. In a harvester-reel, the combination of a reel-post pivoted at its lower end to the frame of the machine, a reel-shaft carriage sliding upon the said post, a lever pivoted to the said post, a link connecting the said lever with the said carriage, a spring-catch and quadrant for holding the said lever and carriage at any desired position, a curved foot-spring pivoted to the post and to the frame of the machine for rocking the said post when depressed, and a spiral-spring device also connected to the said post and to the machine-frame for restoring the post to its original position, substantially as set forth.

4. In a harvester-reel, the combination of the reel-post E, pivoted at its lower end to the frame of the machine, the sliding carriage J for the reel-shaft, the lever G, pivoted to the said post, the link H, connecting the said lever with the said carriage, the spring-catch and quadrant for holding the said lever and carriage at any desired position, the plate 1, having lugs 2 and 3, secured to the said post, the curved foot-spring 4, pivoted at one end to lugs 2, the spiral-spring device pivoted at one end to lug 3, and the fixed bracket 11, having the other ends of the spring 4 and the spiral-spring device pivoted to it, so that the said post may be rocked upon its pivot, substantially as and for the purpose set forth.

5. In a harvester-reel, the combination of the reel-arms, the plates secured on the outer ends of the said reel-arms, having their faces $P^5$ twisted with respect to the central axis of the reel, and the bats pivoted against the twisted faces of the said plates, substantially as and for the purpose set forth.

6. In a harvester-reel, the combination of the rocking post E, the divider 12, having the pin 14 projecting from it, and the slot 15, the pin E', pivoting the said post and divider to the frame of the machine, and the spring 13, secured to the said post and bearing upon the said projecting pin, substantially as and for the purpose set forth.

JACOB BACHMAN.

Witnesses:
JAMES R. KENNEY,
E. F. KEEVER.